(12) United States Patent
Murano et al.

(10) Patent No.: US 7,390,203 B2
(45) Date of Patent: Jun. 24, 2008

(54) SECURE FIBER OPTIC NETWORK KEYED CONNECTOR ASSEMBLY

(75) Inventors: Adam Murano, Lebanon, CT (US); Chester Rynaski, Franklin, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 11/546,147

(22) Filed: Oct. 11, 2006

(65) Prior Publication Data

US 2008/0090433 A1    Apr. 17, 2008

(51) Int. Cl.
H01R 13/44 (2006.01)

(52) U.S. Cl. ...................................... 439/138

(58) Field of Classification Search ............... 439/138; 385/70, 78, 60, 134, 135
See application file for complete search history.

(56) References Cited

U.S. PATENT DOCUMENTS

| | | | |
|---|---|---|---|
| 4,076,361 A | 2/1978 | Campbell | |
| 4,531,798 A | 7/1985 | Baur et al. | |
| 4,596,436 A | 6/1986 | Kraemer et al. | |
| 4,764,129 A | 8/1988 | Jones et al. | |
| 4,781,626 A | 11/1988 | Lazarchik | |
| 4,875,753 A | 10/1989 | Kalomiris | |
| 5,044,994 A | 9/1991 | Van Woensel | |
| 5,167,542 A | 12/1992 | Haitmanek | |
| 5,244,402 A | 9/1993 | Pasterchick, Jr. et al. | |
| 5,274,729 A | 12/1993 | King et al. | |
| 5,335,301 A | 8/1994 | Newman et al. | |
| 5,363,460 A * | 11/1994 | Marazzi et al. | 385/70 |
| 5,420,951 A | 5/1995 | Marazzi et al. | |
| 5,423,692 A | 6/1995 | Francis | |
| 5,506,922 A * | 4/1996 | Grois et al. | 385/75 |
| 5,521,997 A | 5/1996 | Rovenolt et al. | |
| 5,729,644 A | 3/1998 | Shiflett et al. | |
| 6,019,521 A | 2/2000 | Manning et al. | |
| 6,081,647 A * | 6/2000 | Roth et al. | 385/139 |
| 6,130,977 A | 10/2000 | Rosson | |
| 6,179,477 B1 | 1/2001 | DeMarchi | |
| 6,200,040 B1 | 3/2001 | Edwards et al. | |
| 6,224,268 B1 | 5/2001 | Manning et al. | |
| 6,247,850 B1 | 6/2001 | Edwards et al. | |
| 6,305,955 B1 * | 10/2001 | Billman | 439/138 |

(Continued)

FOREIGN PATENT DOCUMENTS

CA    2441872    3/2005

(Continued)

Primary Examiner—T C Patel
Assistant Examiner—Vladimir Imas
(74) Attorney, Agent, or Firm—McCarter & English, LLP

(57) ABSTRACT

Systems and methods for securing a keyed fiber optic network assembly are provided. A typical network system includes an assembly having a security feature and adapted to facilitate fiber optic communication between two mating fiber optic connectors. The security feature is uniquely keyed to disengaged when mated with a corresponding uniquely keyed connector. The security feature includes at least an inner door and a spring and is adapted to prevent optical communication and mating with a receiving connector during illegitimate connector insertion. A typical network includes a plurality of assemblies each having a uniquely keyed security feature. Each of the plurality of assemblies is color coded to match with a legitimate color coded connector to provide guidance to a network user. The connector and the security feature are uniquely keyed through unique positioning of protruding bosses.

22 Claims, 14 Drawing Sheets

U.S. PATENT DOCUMENTS

| | | |
|---|---|---|
| 6,354,746 B1 | 3/2002 | Lee |
| 6,357,930 B1 | 3/2002 | Wiltjer |
| 6,383,032 B1 | 5/2002 | Gerberding |
| 6,422,759 B1 | 7/2002 | Kevern |
| 6,435,730 B1 | 8/2002 | Kevern et al. |
| 6,471,416 B2 * | 10/2002 | Lu ............................. 385/60 |
| 6,554,495 B1 * | 4/2003 | Zhu et al. .................... 385/92 |
| 6,685,362 B2 * | 2/2004 | Burkholder et al. ........... 385/78 |
| 6,688,780 B2 * | 2/2004 | Duran ......................... 385/76 |
| 6,910,807 B2 * | 6/2005 | Lu ............................. 385/60 |
| 6,960,025 B2 | 11/2005 | Gurreri |
| 7,086,878 B2 * | 8/2006 | Mine et al. ................... 439/137 |
| 7,118,286 B2 | 10/2006 | Gurreri et al. |
| 7,182,523 B2 | 2/2007 | Abendschein et al. |
| 7,207,724 B2 | 4/2007 | Gurreri |
| 2005/0117850 A1 | 6/2005 | Milette |
| 2005/0135752 A1 * | 6/2005 | Kiani et al. ................... 385/55 |
| 2005/0220434 A1 * | 10/2005 | Hsieh ......................... 385/134 |
| 2006/0063436 A1 | 3/2006 | Gurreri et al. |

FOREIGN PATENT DOCUMENTS

| | | |
|---|---|---|
| WO | 2005/029147 | 3/2005 |

* cited by examiner

SECURE FIBER OPTIC NETWORK KEYED CONNECTOR ASSEMBLY

BACKGROUND

1. Technical Field

The present disclosure relates to systems and methods for securing a fiber optic network assembly through a keyed connector solution.

2. Background Art

Many transactions take place everyday over the Internet, increasing a need for secure Ethernet communications. Typically, network security is handled in an Ethernet's layers 2-7, providing packet encryption and decryption algorithms up to 256 bit, which is generally considered virtually unbreakable by mathematicians and programmers alike. Although these security techniques have generally been successful in preventing a non-physical security breach, they do not prevent physical tampering or access to secure data channels. For example, encryption and decryption algorithms do not prevent a person internal to an organization from gaining physical access to secure data channels from which said person is restricted. A person having a low level security clearance can sit at another person's workstation who has a higher level of security clearance and thereby access data or information restricted from said individual.

To combat security breach, companies and military bases alike promote isolated networks in the premise environment starting at the data center or main computer room. The use of keying connectors at the user workspace or computer terminal is rapidly becoming the preferred method used to prevent personal connectivity or access to a secure network.

In a keyed connector scenario, an environment, such as a secure finance center at an insurance company or the Pentagon, is universally equipped with keyed fiber optic adapters at each user workstation. It should be known to one having ordinary skill in the art that the term "adapter" is interchangeable with the term "coupler" and refers to a device that creates a connection between two fiber optic ferrules, each containing a light carrying medium of fiber. An adapter typically contains a ceramic or phosphorous bronze alignment sleeve and a number of features that provide for latching the connector into the adapter. A MT-RJ adapter, however, does not use an alignment sleeve as the fibers are aligned by precision pins and holes on the mating connector ferrules.

In a non-secured environment, a user of a network is typically provided with a generic patch cable to attach a laptop or desktop to a network. Thus, the generic patch cable can generally interface with any available port in a building. In a typical secured environment, a network designer isolates the networks by providing a different connector configuration to each of the network security levels. For example, a user is given a patch cable commensurate with the user's assigned security level. If the user attempts to insert the given connector on the patch cable into any adapter other than one designed for it, the connector will not fit and a network connection will not be made. Typically, the connector will not engage the adapter to the full depth. A network connection will only be made when a matching connector and adapter are mated. Generally, the mechanism preventing the light from moving from one connector to the other is a gap between the two fibers. To be clear, the gap is created because the two ferrule end faces are held at a sufficiently preventative distance from each other if the keys are not compatible. These keyed connectors are typically color coded indicating different security levels.

Current exemplary keyed connector systems are described in Canadian patent application No. 2,441,872, U.S. Pat. No. 6,960,025, and US patent application 2005/0117850. These references provide for unique connector to adapter interface via a key and slot methodology. Particularly, these embodiments describe a boss defined on an asymmetric circle mating with an asymmetric key with a protrusion adapted to effectively fit with the appropriate boss. Although these embodiments provide for preventative security breach through improper mating geometry, they do not provide an optical barrier to the receiving means. Thus, an individual using tools can manipulate either the receiving boss or the connecting protrusion to sufficiently fit together allowing for optical fiber communication.

Accordingly, a need exists for effective keyed connector systems and solutions capable of preventing physical network access with unauthorized patch cords. Moreover, a need exists for a keyed solution having an optical barrier for unauthorized keyed connectors. These and other disadvantages and/or limitations are addressed and/or overcome by the assemblies and methods of the present disclosure.

SUMMARY

The present disclosure describes effective systems and methods for a keyed connector fiber network. In an exemplary embodiment, the present disclosure provides for a secure communications connector system including at least one assembly defining (i) a front opening cavity adapted to accept a first mating connector; and (ii) a rear opening cavity adapted to accept a second mating connector. The assembly includes at least one security feature positioned on a bottom surface of the front opening cavity adapted to prevent communication between the connectors during insertion of an illegitimate connector. The security feature includes: (i) an inner door having a mating keying boss; (ii) an outer door defining at least one aperture adapted to allow for a protruding keying boss to pass through the outer door to apply pressure to the mating keying boss; and (iii) a torsion spring adapted to hold the outer door upright in the absence of external pressure. The first mating connector hosts the protruding keying boss extending outwardly towards the security feature adapted to apply pressure to a mating keying boss of the security feature if the first mating connector is legitimately keyed.

Typically, the first mating connector and the second mating connector are fiber optic connectors adapted to optically communicate across an optical pathway of the assembly, wherein the optical pathway is blocked when the security feature is engaged and unblocked when the security feature is disengaged. The security feature is effective in allowing connector communication by rotating a sufficient degree and laying flush and substantially parallel within a bottom surface of the opening cavity, further defined in the assembly, during legitimate connector insertion. The first mating connector can include a sweeping boss on a bottom edge of a front face of the first mating connector protruding outwardly towards the security feature and adapted to apply pressure to the security feature during legitimate connector insertion. In an exemplary system, the security feature is positioned recessed within the front opening cavity.

An inner door associated with the present disclosure includes a main locking boss adapted to substantially engage a main locking slot defined on the outer door. Engaging of the main locking boss and the main locking slot prevents the rotation of the security feature during illegitimate connector insertion. During legitimate connector insertion pressure is applied to the mating keying boss of the inner door by the protruding keying boss of the first connector passing through the aperture of the outer door causing the main locking boss to disengage from the main locking slot allowing the security feature to rotate and the connectors to communicate. The outer door also defines a relief slot adapted to allow for the main locking boss to fit neatly in a back opening of the outer door during rotation of the security feature. Moreover, the outer door typically further defines a pass through aperture adapted to prevent damaging a ferrule included on the first connector during legitimate or illegitimate connector insertion.

A mating keying boss of the inner door associated with the present disclosure is typically uniquely positioned on the inner door to effectively mate with a matching protruding keying boss of a legitimate connector. The inner door defines a plurality of locations to uniquely position the mating keying boss. Typically, the assembly and the corresponding matching connector are color coded to match colors to provide for visual guidance to a network user. In an exemplary embodiment, the assembly includes a second security feature positioned on a bottom surface of the rear opening cavity.

In an exemplary embodiment, the present disclosure describes a secure connector system having an assembly including: (i) a front opening cavity; (ii) a rear opening cavity; and (iii) a security feature. The front opening cavity and the rear opening cavity are each adapted to accept a keyed mating connector having a protruding mating keying boss. The security feature is positioned on a bottom surface of the front opening cavity and prevents communication between two illegitimate keyed mating connectors and allows communication between two legitimate mating connectors by the mechanism of an inner door standing vertical when engaged and rotating downward when disengaged.

An exemplary security feature includes: (i) an inner door defining a mating keying sloped aperture adapted to accept the mating keying boss of the first mating connector; (ii) two die cast boss elements attached to the sides of the inner door and adapted to slide into two channels further defined on the bottom surface of the opening cavity; (iii) a cam shaped element attached to a rear side of the inner door; (iv) a leaf spring interacting with the cam shaped element wherein the leaf spring applies pressure to the cam shaped element holding the inner door upright in the absence of external pressure; and (v) a locking boss extending outwardly on a front face of the inner door in contact with a lip feature included on the opening cavity of the assembly and adapted to prevent rotation of the inner door during illegitimate connector insertion.

Typically, the protruding keying boss extends outwardly towards the security feature and is adapted to apply pressure to the mating keying sloped aperture of the inner door if the first mating connector is legitimately keyed. The first mating connector and the second mating connector can be fiber optic connectors adapted to optically communicate across an optical pathway of the assembly. The optical pathway is substantially blocked when the security feature is engaged and unblocked when the security feature is disengaged. During legitimate connector insertion, the security feature will rotate a sufficient degree and lay flush and substantially parallel within a bottom surface cavity further defined in the assembly to allow for the mating connectors to communicate during legitimate connector insertion via the optical pathway. The security feature is disengaged when the protruding keying boss of a legitimate connector applies pressure to the mating keying sloped aperture causing the inner door to transition downward into two channels defined on the bottom surface of the front opening cavity disengaging the locking door. The inner door rotates downwardly during legitimate connector insertion resulting from pressure being applied to the inner door from a front face of the legitimate connector.

Typically, the security feature is positioned recessed within the front opening cavity. The mating keying sloped aperture of the inner door is uniquely positioned on the inner door to effectively mate with a matching protruding keying boss of a legitimate connector. In an exemplary embodiment, the inner door defines a plurality of locations to uniquely position the mating keying sloped aperture. An assembly and a corresponding matching connector associated with the present disclosure should be color coded to match colors to provide for visual guidance to a network user. In an exemplary embodiment, the assembly includes a second security feature positioned on a bottom surface of the rear opening cavity.

The present disclosure provides for a secure communications network system including a plurality of assemblies wherein each assembly is uniquely color coded to match with a corresponding uniquely color coded mating connector. Accordingly, each of the plurality of assemblies is colored a designated color corresponding to a matching colored legitimate connector providing visual guidance to a network user.

The present disclosure also provides for a method for securing a communications network system providing a plurality of assemblies wherein each assembly includes a security feature wherein each security feature (i) includes at least an inner door, and (ii) is positioned on a bottom surface of an opening cavity defined within the assembly adapted to accept a unique keyed mating connector. The method includes uniquely keying each security feature to include a keying boss on the inner door or a keying aperture physically corresponding to the unique keyed mating connector. An exemplary method includes color coding each assembly and unique mating connector wherein matching colors will legitimately mate and disengage the security feature to allow communication with a receiving mating connector inserted into a rear cavity defined within the assembly.

Additional features, functions and benefits of the disclosed systems and methods will be apparent from the description which follows, particularly when read in conjunction with the appended figures.

BRIEF DESCRIPTION OF THE DRAWINGS

To assist those of ordinary skill in the art in making and using the disclosed assemblies and methods, reference is made to the appended figures, wherein.

DESCRIPTION OF EXEMPLARY EMBODIMENT(S)

Figure 1:
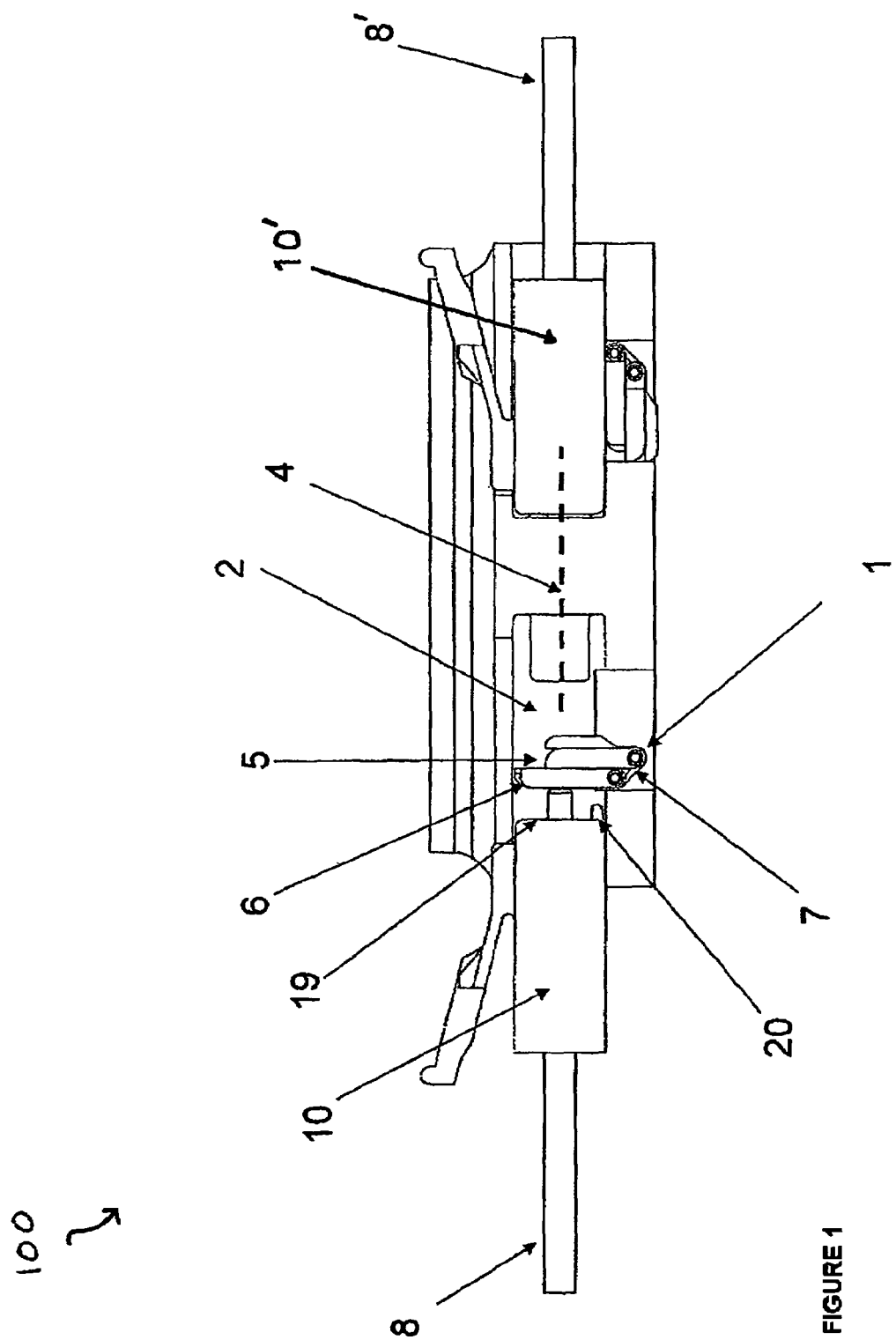
FIG. 1 is a schematic illustrating a cross sectional view of an exemplary assembly associated with the present disclosure.

The present disclosure provides for a uniquely advantageous system that is effective in securing a multiport fiber optic connector assembly. FIG. 1 illustrates an exemplary embodiment of a single port assembly 100. A network system typically will have a plurality of assemblies 100 each defining a unique keyed solution consistent with the present disclosure. As described above, a patch cord hosting a connector at the connection end will be a specified color, e.g., blue, green, red, etc. Each color represents a different security/access level for a user.

An exemplary assembly 100 associated with the present disclosure includes a security feature 1, typically a spring loaded dual shutter door apparatus, integrated with an internal front opening cavity 2. Typically, security feature 1 includes a torsion spring 7, an outer door 6 and an inner door 5. Security feature 1 is adapted to serve as a barrier to optical pathway 4 from optical communication between two mating fiber optic connectors. As shown in FIG. 1, security feature 1 is engaged effectively preventing optical communication through pathway 4. In an exemplary embodiment, only one legitimate connector configuration can effectively release inner door 5 thus disengaging inner door 5 from outer door 6, allowing for security feature 1 to be substantially shifted to a sufficiently effective position to allow for communication and mating among connectors via pathway 4.

Security feature 1 can be described as a two door locking mechanism, which is accomplished by an interference engagement between outer door 6 and inner door 5. Thus, when assembly 100 is not connected to a connector, torsion spring 7 applies force to inner door 5 engaging outer door 6 resulting in security feature 1 to be in an obstructing position of optical path 4. Accordingly, when no connector is engaged with assembly 100, then security feature 1 is engaged, i.e. blocking optical access to pathway 4.

Typical data communication is achieved by optically connecting fibers 8, attached to a mating connector 10 at one end to receiving fibers 8' attached to a mating connector 10' through optical pathway 4. Connector 10 is appropriately configured and colored to mate with an associated assembly 100. Assembly 100 is typically the same color as the associated connector 10. Inserting a matching connector 10 into an assembly 100 will disengage security feature 1 allowing for communication via pathway 4 with receiving connector 10'.

Insertion of connector 10 into assembly 100 unlocks, i.e., disengages security feature 1 thus effectively permitting optical access through pathway 4 to connector 10', thus fibers 8'.

Figure 2:
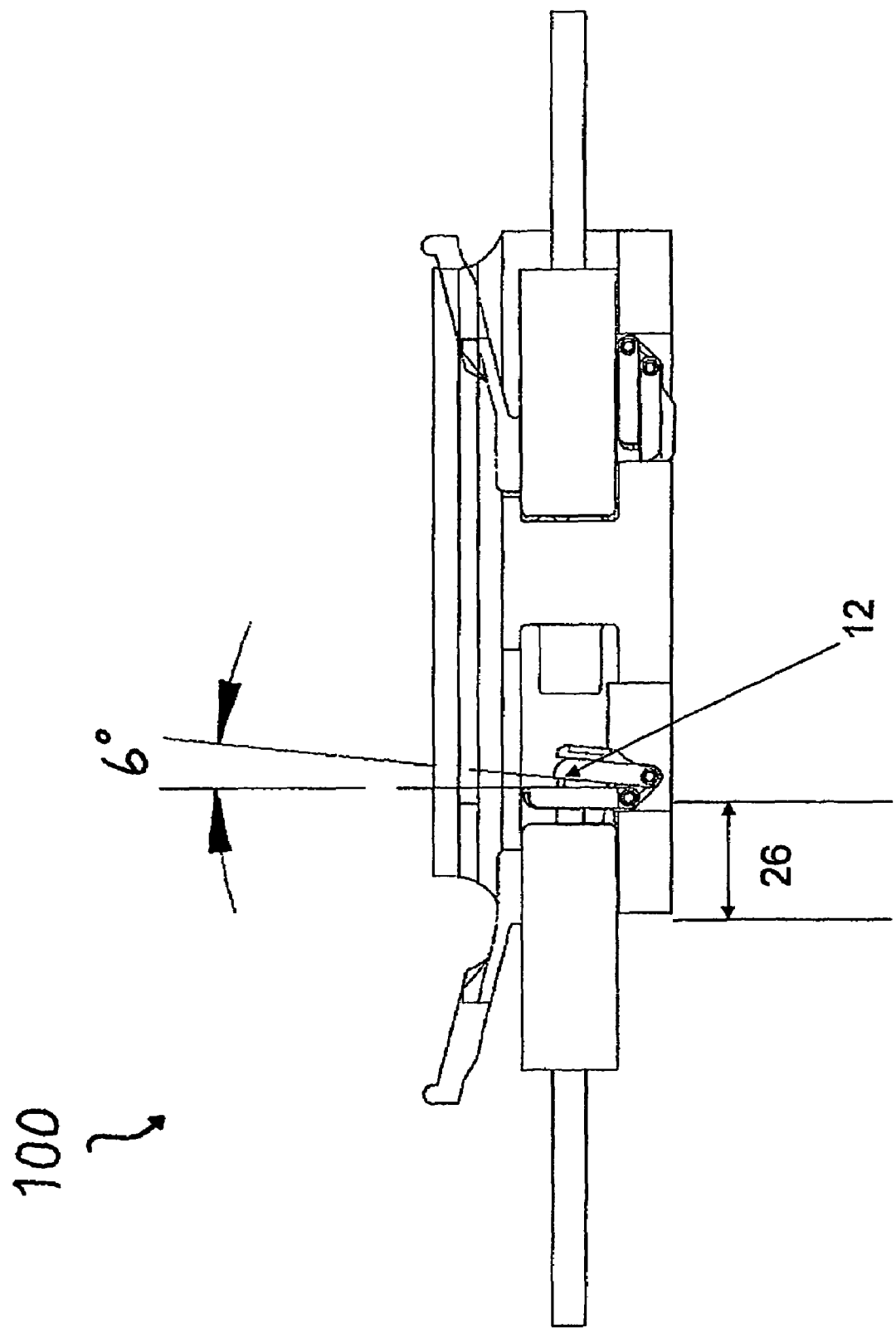
FIG. 2 is a cross sectional view of an exemplary assembly associated with the present disclosure illustrating a security feature being disengaged.
Figure 4:
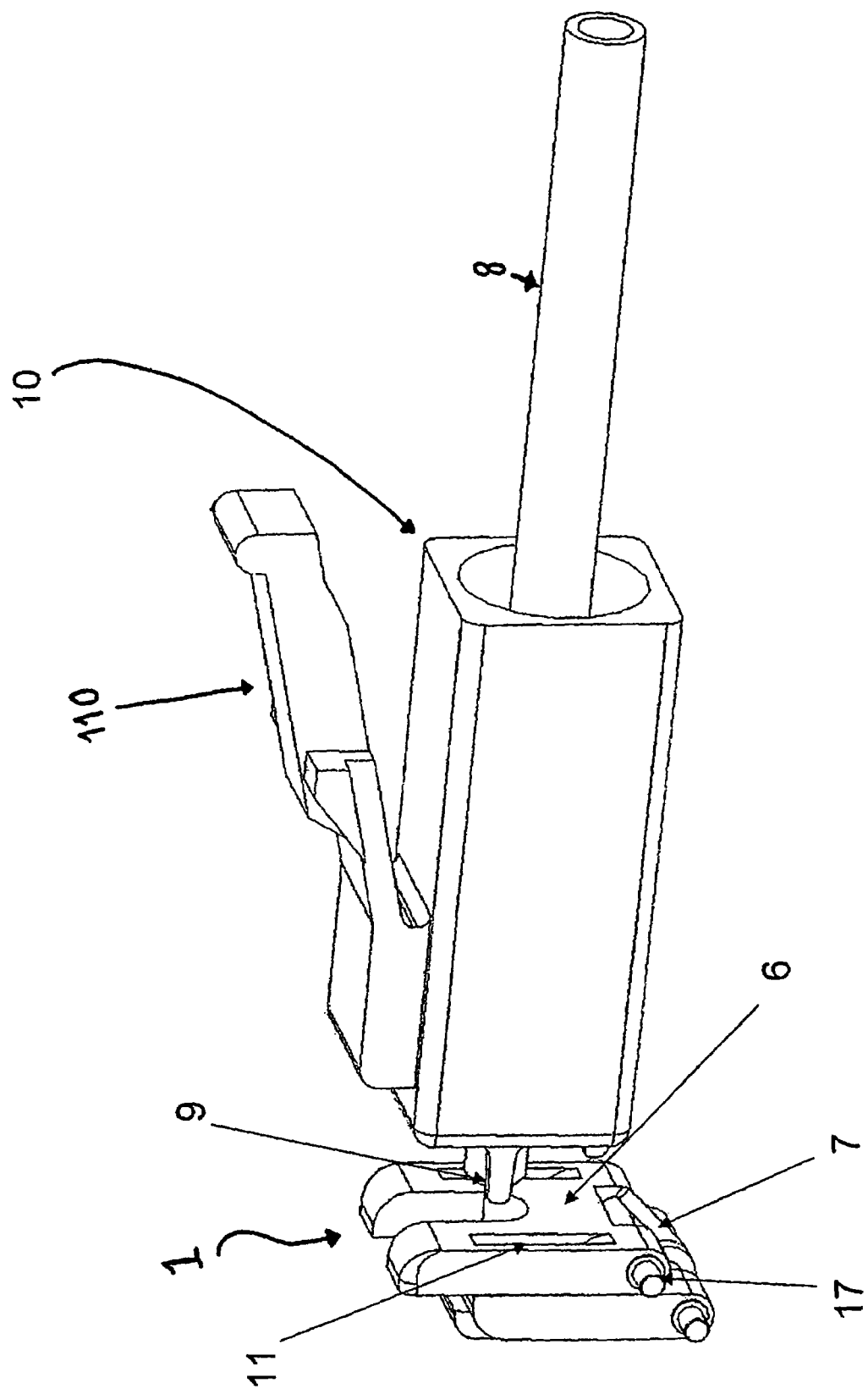
FIG. 4 is a perspective view illustrating the mating mechanism of a connector with the security feature associated with the present disclosure.

The unlocking mechanism of security feature 1 is facilitated by a protruded keying boss 9, as shown in FIG. 4, of a legitimate mating connector 10. Referring to FIG. 4, boss 9 passes through a slot or aperture 11 defined on outer door 6. Boss 9 applies force to a mating keying boss 12 defined on inner door 5 as shown in FIG. 2. When keying boss 9 applies pressure to keying boss 12 of inner door 5, inner door 5 will rotate from its initial position. In an exemplary embodiment, inner door 5 will rotate at least six degrees relative to a locking vertical position when engaged with outer door 6 as shown in FIG. 2. As inner door 5 rotates, a main locking boss 14 included on inner door 5, shown in FIG. 5, disengages from a main locking slot 15 defined on outer door 6 as shown in FIG. 6.

FIG. 2 illustrates an exemplary embodiment of assembly 100 at a point when inner door 5 and outer 6 are being disengaged. In an exemplary embodiment, security feature 1 is recessed a distance 26 within inner cavity 2 and is adapted to prevent illegitimate unlocking of apparatus 1. Distance 26 should be sufficient to prevent a user from simultaneously inserting a readily available tool, such as a pencil or a pin, to disengage boss 12 of inner door 5.

Figure 3:
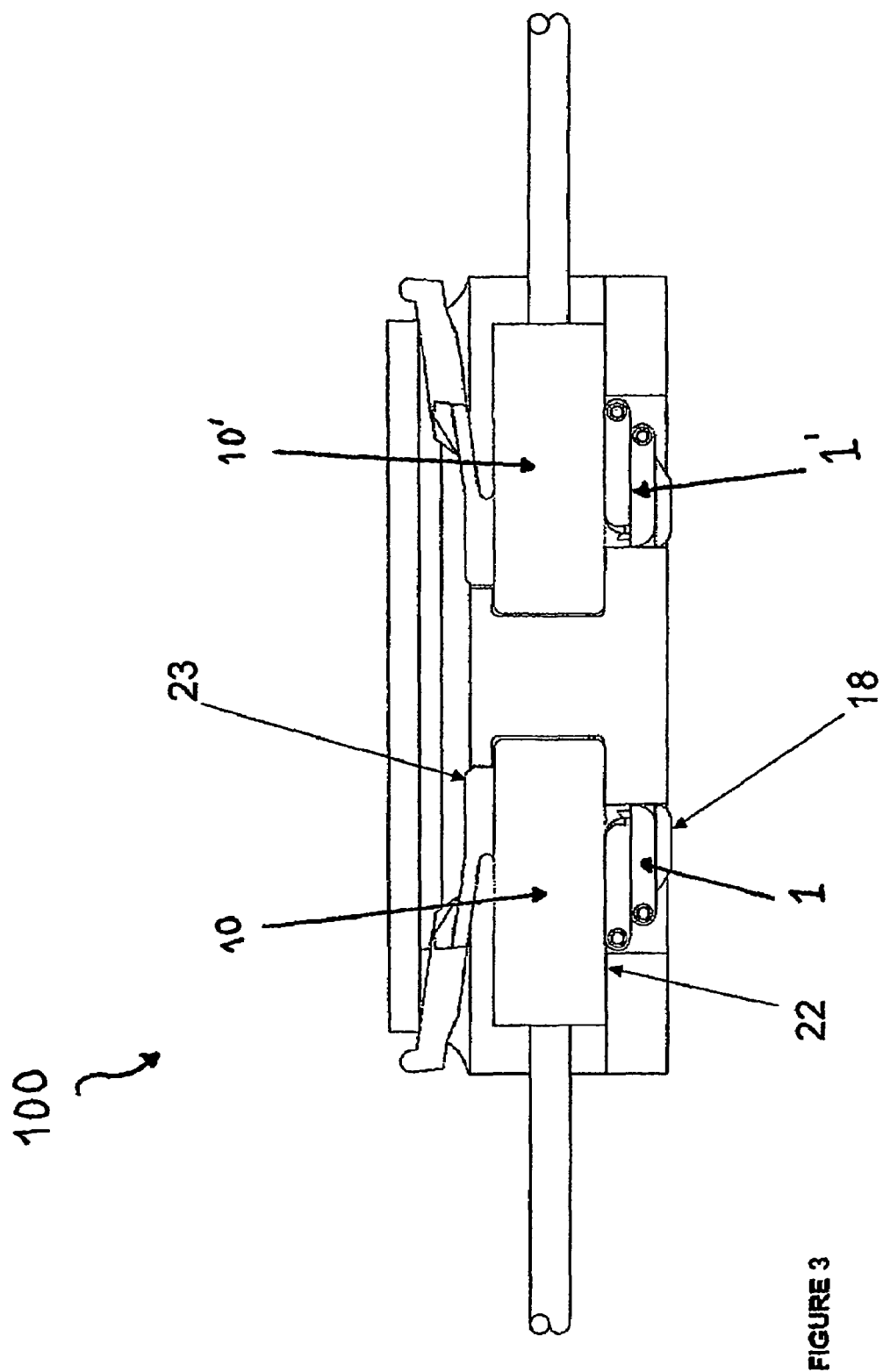
FIG. 3 is a cross sectional view of an exemplary assembly associated with the present disclosure illustrating legitimate communication connectors fully inserted into the assembly with the security feature disengaged.

Referring to FIG. 3, an exemplary embodiment is illustrated in which assembly 100 is equipped with an security feature 1 that is hingedly attached on a bottom surface 22 of cavity 2. Assembly 100 should be designed such that connector 10 is flush with both a top surface 23 and bottom surface 22 of cavity 2. In an exemplary embodiment, assembly 100 includes an additional security feature 1' positioned on a bottom side of a rear opening cavity adapted to receive a receiving mating connector. FIG. 3 illustrates a cross sectional view of assembly 100 with both legitimate connector 10 and connector 10' inserted into assembly 100 and each security feature 1 being disengaged allowing for optical communication between the connectors.

FIG. 3 illustrates an exemplary embodiment of the present disclosure of a legitimate connector insertion. As shown in FIG. 3, inner door 5 is rotated to disengage outer door 6 by the contact between the connector keying boss 9 and the inner door keying boss 12. The two doors then rotate together to at least an extent sufficient to allow optical connectivity between connector 10 and receiving connector 10' thus allowing communication between fibers 8 and 8'. Typically, assembly 100 defines a bottom surface cavity 18 adapted to allow for apparatus 1 to lay flush and parallel with the base of assembly 100 thus allowing for connector 10 to optically connect with receiving connector 10'. Sufficient rotation of security feature 1 occurs as a result of continual force by a front face 19 of connector 10 as shown in FIG. 1. In an exemplary embodiment, connector 10 includes a sweeper boss 20 integrally connected to connector 10 along a bottom edge of a front face of connector 10 as shown in FIG. 1. Sweeper boss 20 is effective in maintaining depression of security feature 1 as connector 10 is being inserted thus preventing possible fiber damage to a ferrule of connector 10.

FIG. 4 is a perspective view of an exemplary embodiment of a connector 10 approaching an security feature 1 with aspects of assembly 100 omitted to illustrate the mating mechanism of security feature 1. An exemplary connector 10 includes keying boss 9 adapted to pass through slot 11 of outer door 6. Typically outer door 6 defines a pair of slots 11 substantially vertical and perpendicular to the inserting connector 10 and substantially parallel relative to each other. Element 110 is partially attached to a top surface of connector 10 and partially unattached to connector 110 extending away from security feature 1. Element 110 is typically a suppression tab adapted to secure connector 10 to assembly 100 once legitimately inserted. FIG. 4 illustrates an exemplary engaged configuration of security feature 1 which includes inner door 5 and outer door 6 mated with each other. Typically, inner door 5 is configured sufficiently lower than outer door 6 such that the associated locking mechanisms are effective. Additionally, inner door 5 and outer door 6 should be adapted to be able to clear ferrule alignment sleeve aperture when rotating through to the disengaged position. Security feature 1 includes spring 7 and hinge 17.

Figure 5:
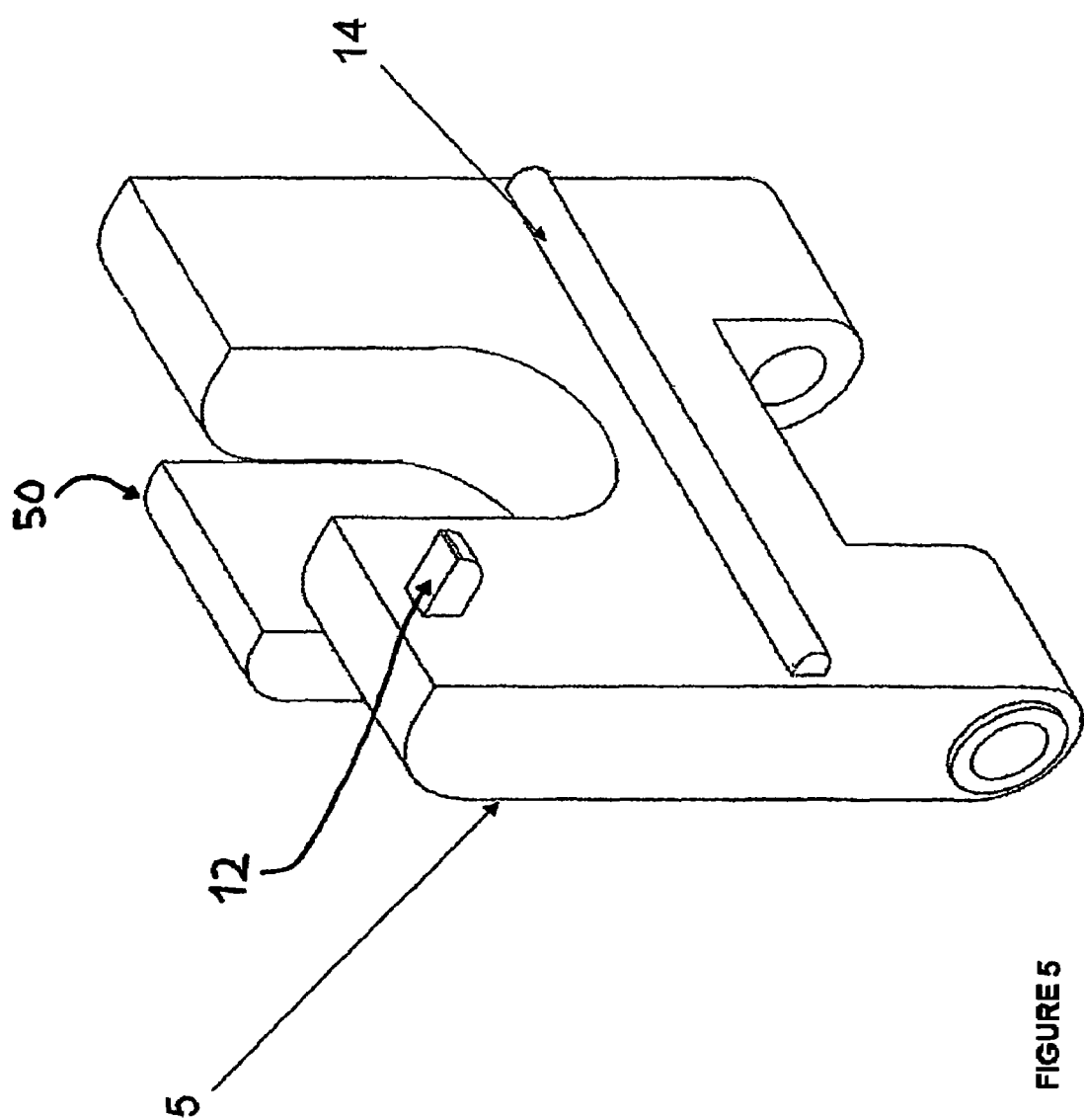
FIG. 5 is a schematic perspective view of an inner door associated with the present disclosure.
Figure 6:
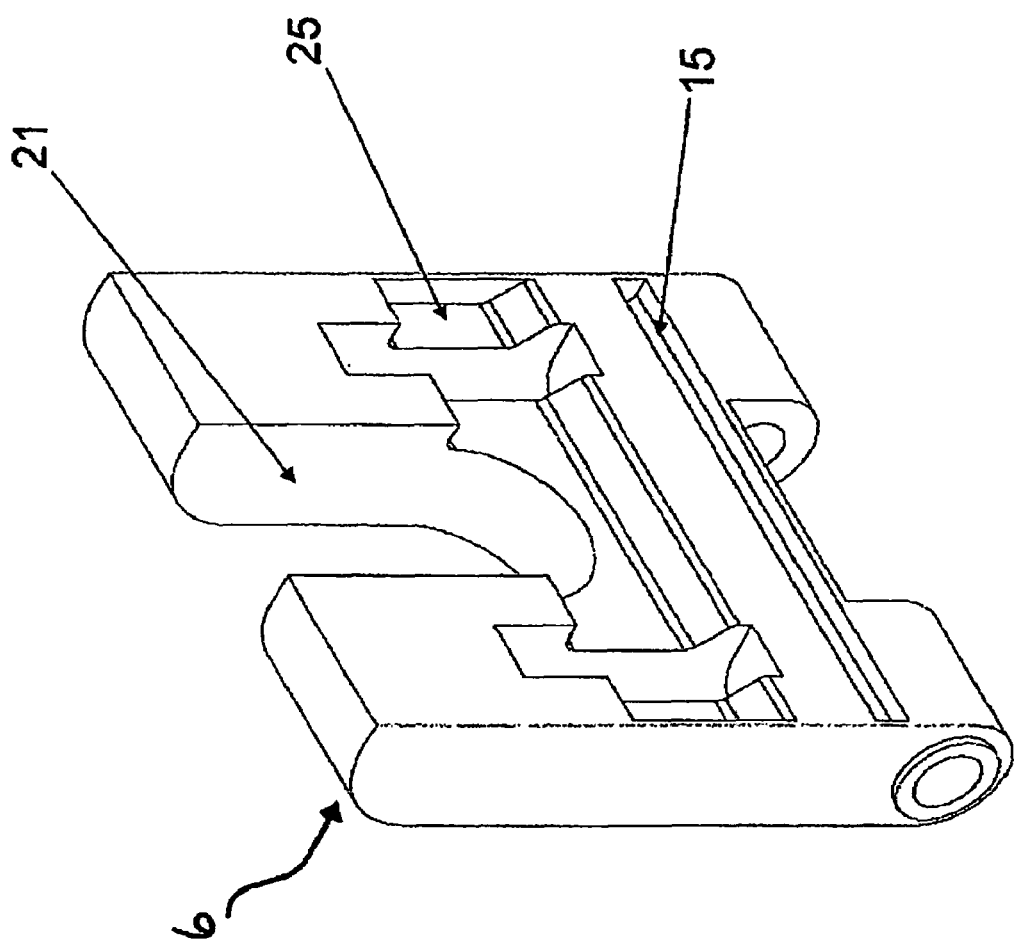
FIG. 6 is a schematic perspective view of an outer door associated with the present disclosure.

Referring to FIG. 5, main locking boss 14 is adapted to provide sufficient material cross-sectional area such that inner door 5 and outer door 6 cannot be forced open with an application of force, for example by an incorrect connector type. In an exemplary embodiment, main locking boss 14 is adapted to alleviate keying boss 12 of inner door 5 from having to bear any shear load incurred from insertion of an illegitimate connector. If an illegitimate connector is forcibly installed in the internal cavity 2 of an assembly 100, security feature 1 will not depress allowing optical access through pathway 4 to receiving connector 10'. Particularly, keying boss 12 of inner door 5 will not receive the necessary applied force thus not causing inner door 5 to rotate appropriately to disengage main locking boss 14 from outer door 6. Typically, illegitimate forced insertion will result in a distributed load applied to the face of outer door 6. Accordingly distributed load applied to door 6 will result in a moment about an outer door axle 17 as shown in FIG. 4. In an exemplary embodiment, security feature 1 is adapted to resist illegitimate entry. Distributed load on outer door 6 generating a moment about axle 17 instigates resistance by the shear strength of main locking boss 14 being engaged with the main locking slot 15.

FIG. 6 illustrates an exemplary embodiment of outer door 6 associated with security feature 1 of assembly 100. Outer door 6 defines a pass through aperture 21 adapted to allow for a ferrule associated with connector 10 to pass through unharmed. Moreover, aperture 21 should be configured so that optical fiber 8 is not damage during insertion, regardless of whether or not the connector is legitimate. Aperture 21 permits connector 10 to move inward such that keying boss 9 can insert pressure to boss 12. Door 6 also defines a relief slot 25 adapted to allow for main locking boss 14 of inner door 5 to fold neatly into a back opening of outer door 6 during legitimate insertion of connector 10. As inner door 5 and outer door 6 rotate down during insertion, boss 14 effectively slides into the back opening of outer door 6.

Figure 7:
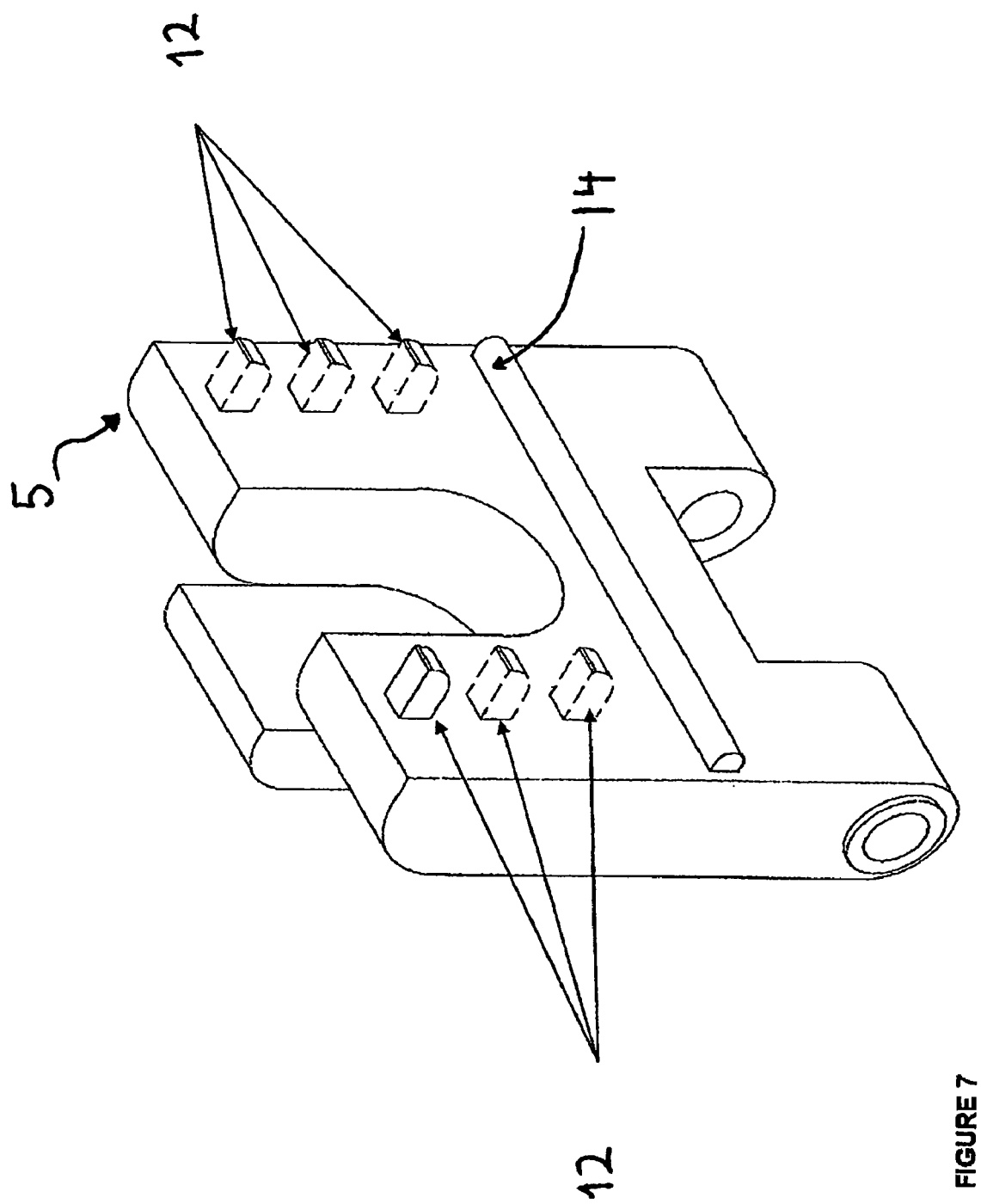
FIG. 7 is a schematic perspective view of an outer door associated with the present disclosure illustrating a plurality of exemplary unique positions for a keying mating boss.

FIG. 7 is a perspective view of an exemplary door 5 illustrating a plurality of exemplary positions for boss 12. Since typical keyed networks host a plurality different security levels, inner door 5 should be configured to host several possible positions for boss 12. Typically, a keyed network will support six different security ports and thus an exemplary door 5 should host about six unique boss 12 positions. Each unique boss 12 positions will correspond to a unique legitimate connector 10 having a unique boss 9 position. A unique assembly and associated unique connector should be color coded providing visual guidance to a network user.

An exemplary assembly according to the present disclosure should provide for a calculated maximum resistance to insertion force of over 60 lbs. Experimentation shows aggressive hand insertion of an LC connector yields only 13 lbs of force. Exemplary embodiments include making both inner door 5 and outer door 6 from a cast Zinc (e.g., ZA-12). It is noted that fabricating inner door 5 and outer door 6 from plastic typically can provide for decreased shear strength relative to metal doors. Plastic is effective in preventing accidental improper network connector insertion, however, metal doors are more robust in preventing an intentional defeat of an assembly associated with the present disclosure.

A particular advantage associated with the present disclosure includes inner door 5 of assembly 100 effectively being a positive mechanical blockage of optical pathway 4. Thus, a network cannot receive light transmission, due to the opacity of inner door 5, between coaxial fibers 8 and 8' unless a legitimate fiber connector assembly is used. Moreover, an exemplary inner door 5 can provide for an added benefit of providing eye safety on assembly 100. Eye safety is a generally new concept as power levels of transmitters are increasing to service new higher power, higher speed networks. Referring to FIG. 5, in an exemplary embodiment, inner door 5 further includes a security obstruction feature 50 adapted to positively block light transmission between connectors. Feature 50 is essentially a physical barrier to light transmission thus operating as an additional security aspect to security feature 1. Feature 50 is connected to inner door 5 and extends a sufficient distance away from inner door 5 to provide sufficient distance from an inserting ferrule as to not come into contact with the ferrule.

Figure 8:
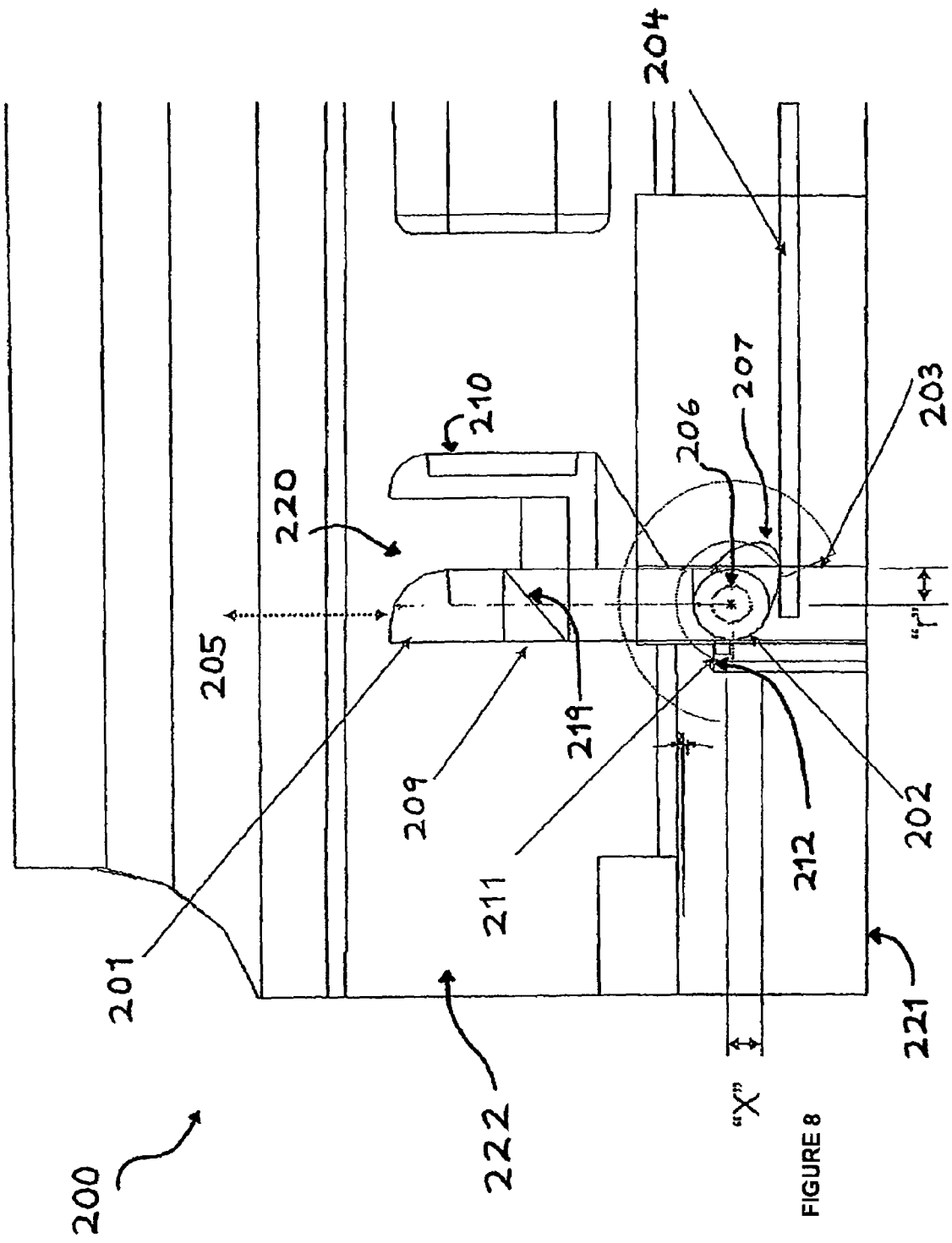
FIG. 8 is a schematic illustrating a single door embodiment of a security feature associated with the present disclosure.

Referring to FIG. 8, an exemplary assembly 200 is shown including a security feature 220. Security feature 220 includes a single inner door 201 positioned on a bottom surface 221 of a front opening cavity 222 of assembly 200, and is adapted to stand vertical when engaged and lay flush and parallel with bottom surface 221 of opening cavity 222 when disengaged by a legitimate connector. Accordingly, the single door embodiment as shown in FIG. 8 is adapted to accomplish the same advantageous aspects described above in the double door embodiment, i.e., prevent illegitimate connector insertion and block the optical path to the rear connector of the assembly.

Single door 201 of security feature 220 defines a mating keying sloped aperture 209 adapted to accept a keying boss positioned on a legitimate connector. Aperture 209 is on a front face of inner door 201 facing towards an inserting connector. Typically, a bottom surface 219 within aperture 209 slopes substantially upward creating a surface that is adapted to cause inner door 201 to transition vertically downward along path 205 when external pressure is exerted. Security feature 220 further defines two channels 203 adapted to allow double die cast boss elements 202 attached to inner door 201 to travel downward during legitimate connector insertion. Inner door 201 is also attached to a cam element 207 adapted to interact with a leaf spring 204.

Boss elements 202 extend outwardly, typically perpendicular to the direction of the optical pathway. Cam element 207 extends at a sufficient angle on the rear side of inner door 201 to apply pressure to leaf spring 204. When inner door 201 transitions downwardly along pathway 205, cam element 207 applies pressure to leaf spring 204 creating tension in spring 204. Channels 203 allow for boss elements 202 to slide downward along with inner door 201. Inner door 201 includes a front side protruding locking boss 211 adapted to press against a lip feature 212 of bottom surface 221 of assembly 200. Locking boss 211 is substantially flush with lip feature 212 thus preventing rotation of inner door 201 without first lowering inner door 201. Once inner door 201 transitions downward a sufficient distance, locking boss 211 will also lower a distance "X" and thus will not interact with lip feature 212 during rotation.

Leaf spring 204 is adapted to hold inner door 201 in a vertical obstructing position, or "flipped up" position in the absence of a legitimate connector or during insertion of an illegitimate connector. Leaf spring 204 holds inner door 201 in vertical position by causing a moment 206 about boss elements 202 by applying force to cam element 207. Cam element 207 allows leaf spring 204 to apply a non-symmetric force a distance "r" from the center of boss elements 202 while simultaneously maintaining inner door 201 in upright "flipped up" position.

Accordingly, in an exemplary embodiment, security feature 220 is disengaged as follows:

a. A legitimate connector (not shown) is inserted into open cavity 222 and the protruding keying boss (not shown) on the connector mates with aperture 209;

b. As the connector is being inserted, the keying boss applies pressure to the sloped bottom surface 219 causing inner door 201 to transition downward;

c. As inner door 201 transitions downward, locking boss 211 transitions downward a distance "X" allowing locking boss 211 to freely rotate since it is no longer flush with lip 212;

d. Once inner door 201 transitions a sufficient distance "X," the face of the connector (not shown) comes into contact with inner door 201 and applies sufficient pressure to cause inner door 201 to rotate downwardly;

e. Inner door 201 rotates a sufficient amount to allow the legitimate connector to optically communicate with a receiving connector (not shown) inserted in a rear cavity (not shown) of assembly 200;

f. Once the legitimate connector is removed, moment 206 on cam element 207 swings the door upright and then the spring 204 shifts inner door 201 back into position where locking boss 211 is in contact with lip 212.

In an exemplary embodiment, inner door 201 hosts a plurality of possible positions for aperture 209. A legitimate connector will have a protruding keying boss that specifically mates with the appropriately positioned aperture 209. Although an exemplary inner door associated with the present disclosure can host a plurality of apertures, e.g. six apertures on an inner door, only the keyed aperture will have a sloped bottom surface adapted to cooperate with the disengaging mechanism described above.

Figure 9:
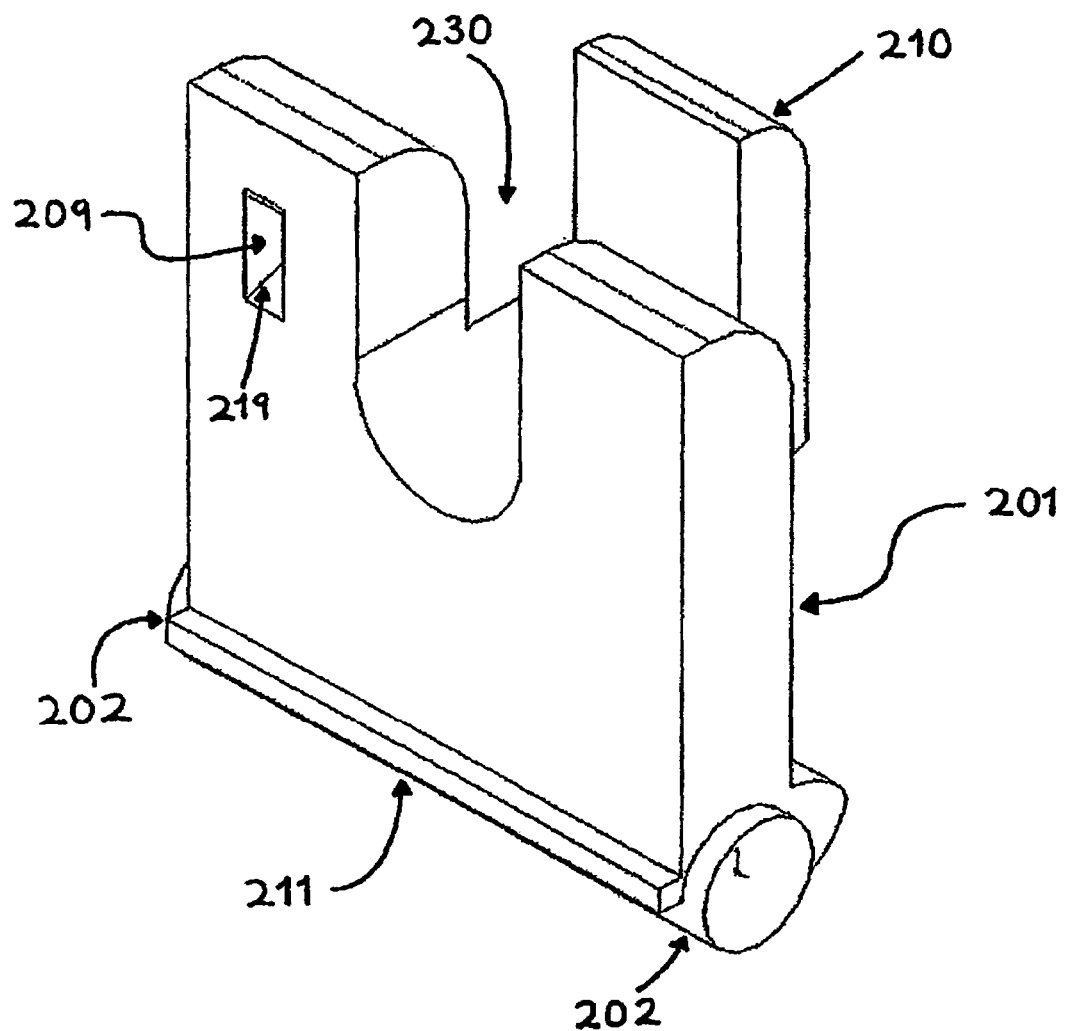
FIG. 9 is a perspective view illustrating an exemplary inner door associated with the present disclosure.

FIG. 9 illustrates a perspective view of inner door 201. As shown in FIG. 9, inner door 201 includes boss elements 202, locking boss 211 and defines aperture 209. Typically inner door 201 further defines a pass through aperture 230 adapted to allow a ferrule (not shown) of an inserting connector to pass through unharmed. Thus, when a connector is inserted, whether it be a legitimate connector or not, the ferrule will not come in contact with inner door. In order to prevent optical communication between two connectors across an optical pathway, inner door 201 can further include a security obstruction feature 210 as shown in FIGS. 8 and 9. Obstruction feature 210 is adapted to positively block light transmission between connectors. Feature 210 is essentially a physical barrier to light transmission thus operating as an additional security aspect to security feature 220. Feature 210 is connected to inner door 201 and extends a sufficient distance away from inner door 201 to provide sufficient distance from an inserting ferrule as to not come into contact with the ferrule.

Figure 10:
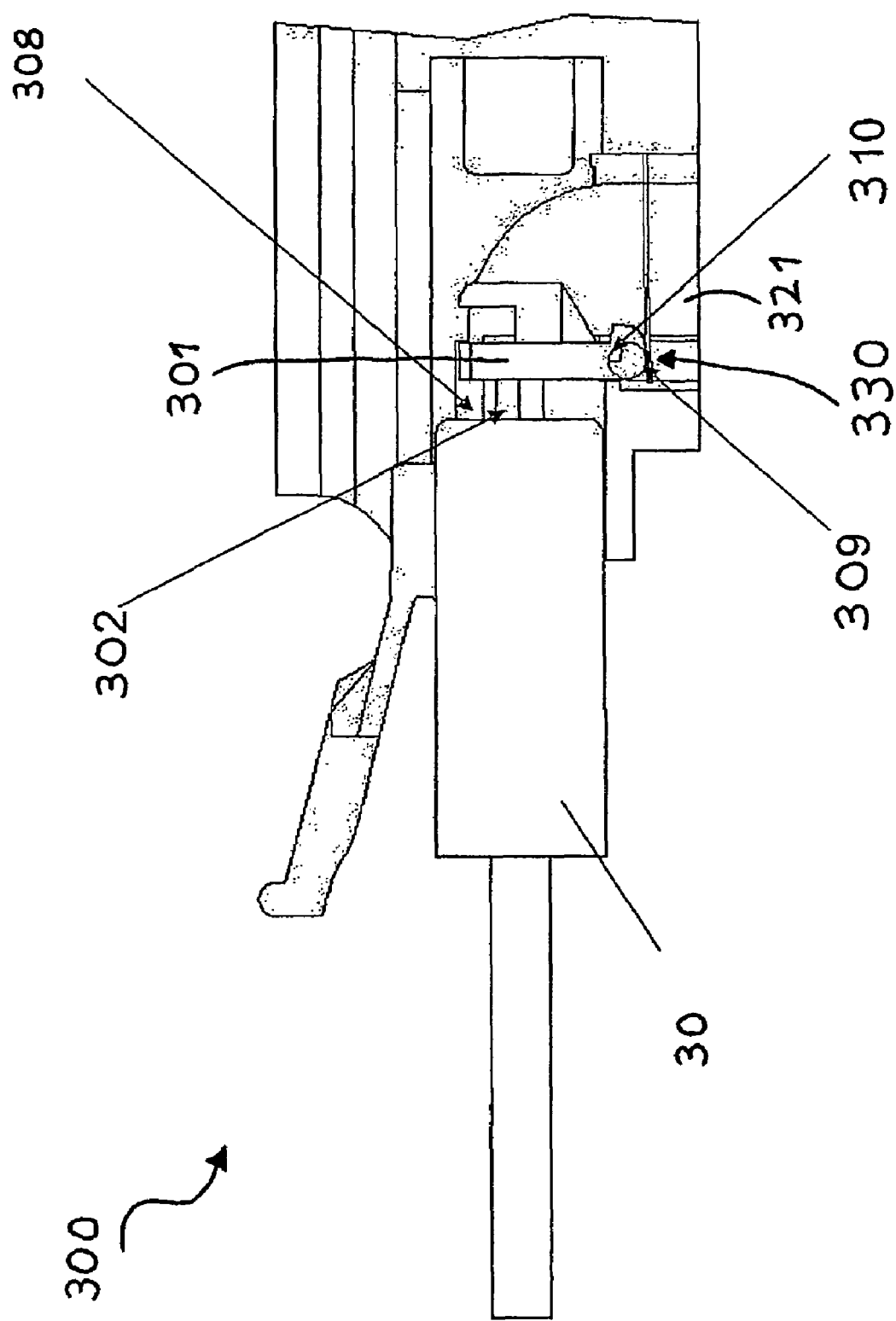
FIG. 10 is a schematic illustrating a legitimate connector inserting into a front side open cavity of a single door embodiment assembly associated with the present disclosure.
Figure 11:
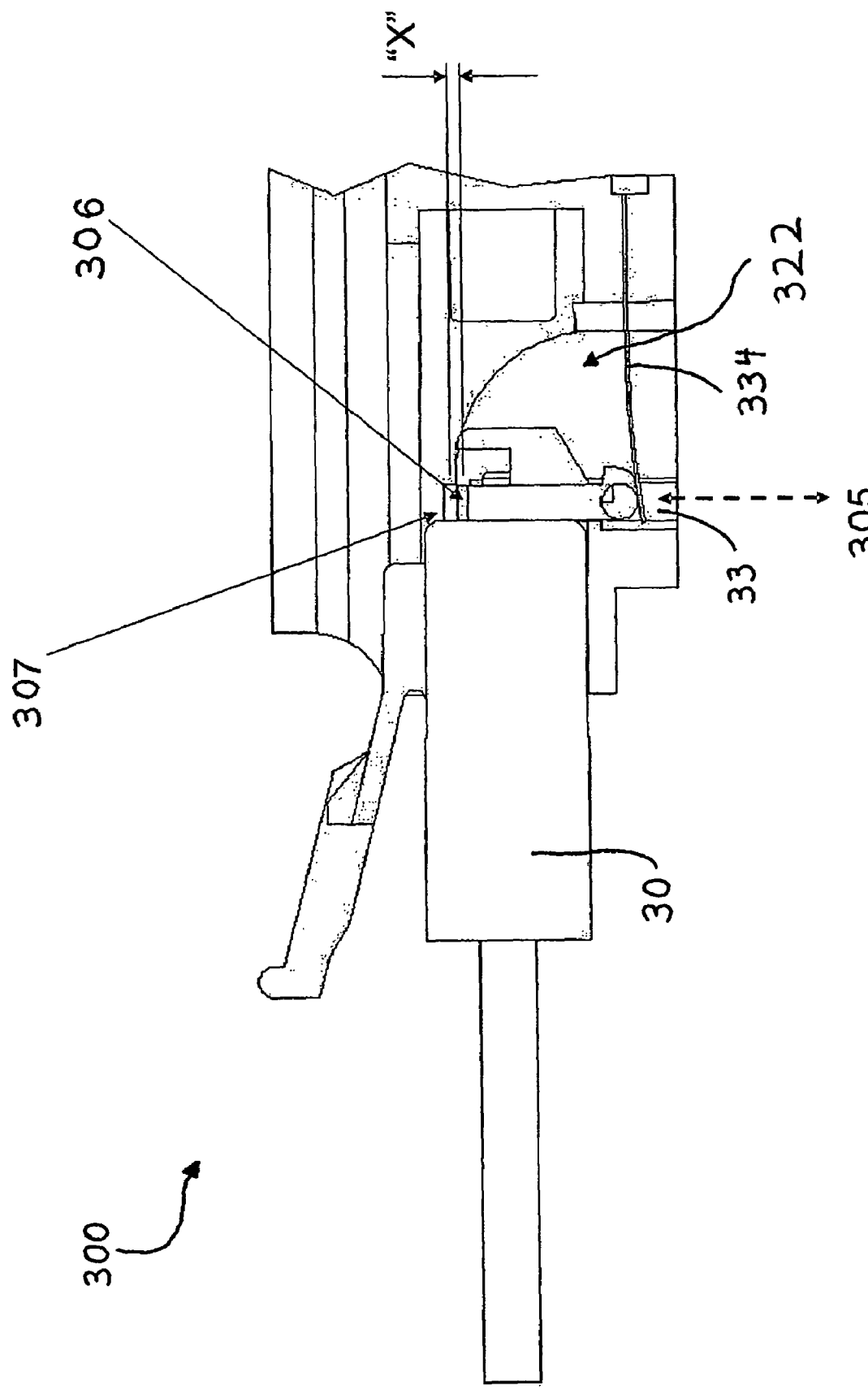
FIG. 11 is a schematic illustrating a legitimate connector engaging the security feature associated with the single door embodiment assembly of FIG. 10.

Referring to FIG. 10, an exemplary assembly 300 is shown including a security feature 330. Security feature 330 includes a single inner door 301 positioned on a bottom surface 321 of a front opening inner cavity 322 of assembly 300, and is adapted to stand vertical when engaged and lay flush and parallel with bottom surface 321 of opening cavity 322 when disengaged by a legitimate connector. Accordingly, the single door embodiment as shown in FIG. 10 is adapted to accomplish the same advantageous aspects described above in the alternative single door and double door embodiments, i.e., prevent illegitimate connector insertion and block the optical path to the rear connector of the assembly.

Figure 12:
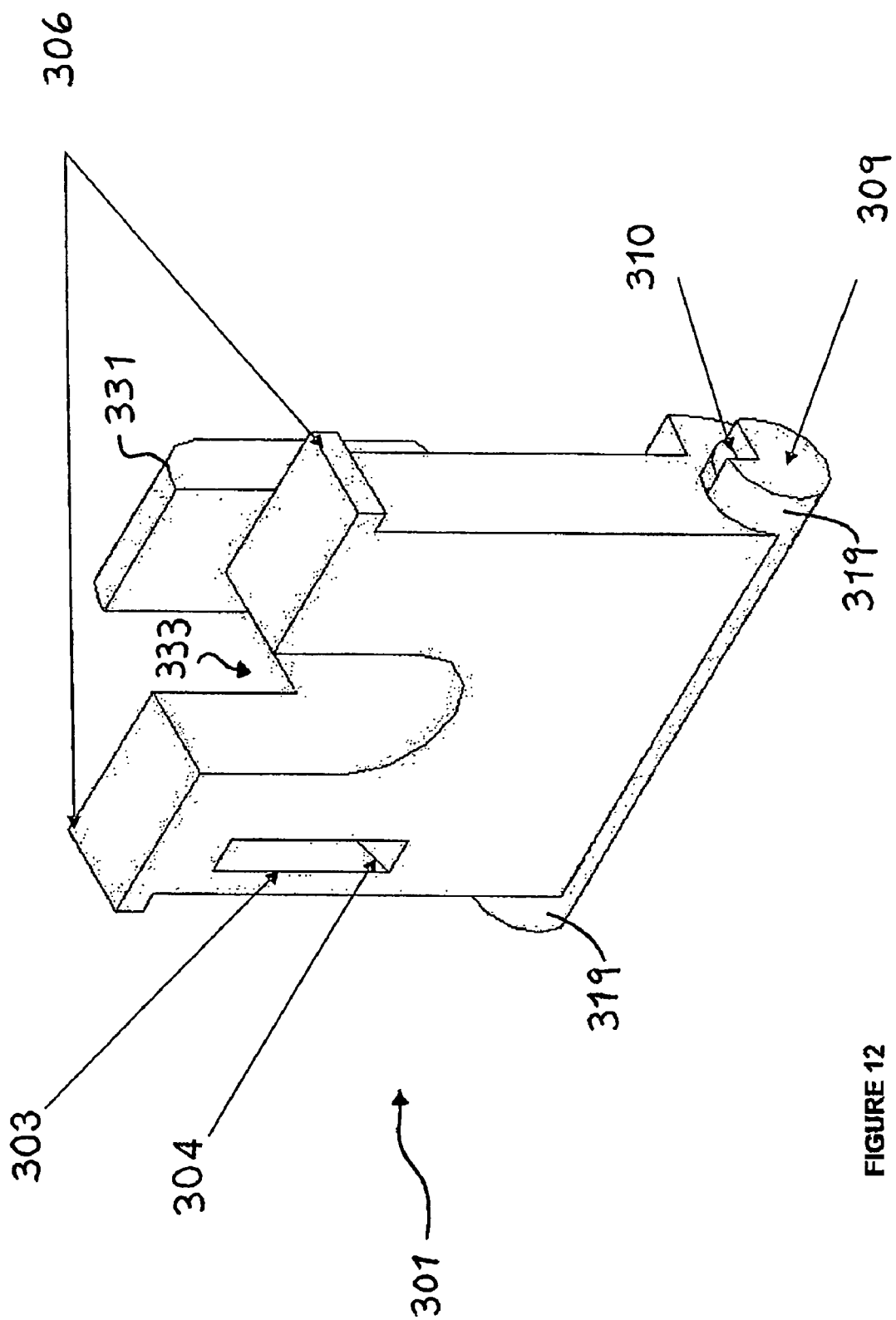
FIG. 12 is a perspective view of an exemplary inner door associated with the single door embodiment of FIG. 10.
Figure 13:
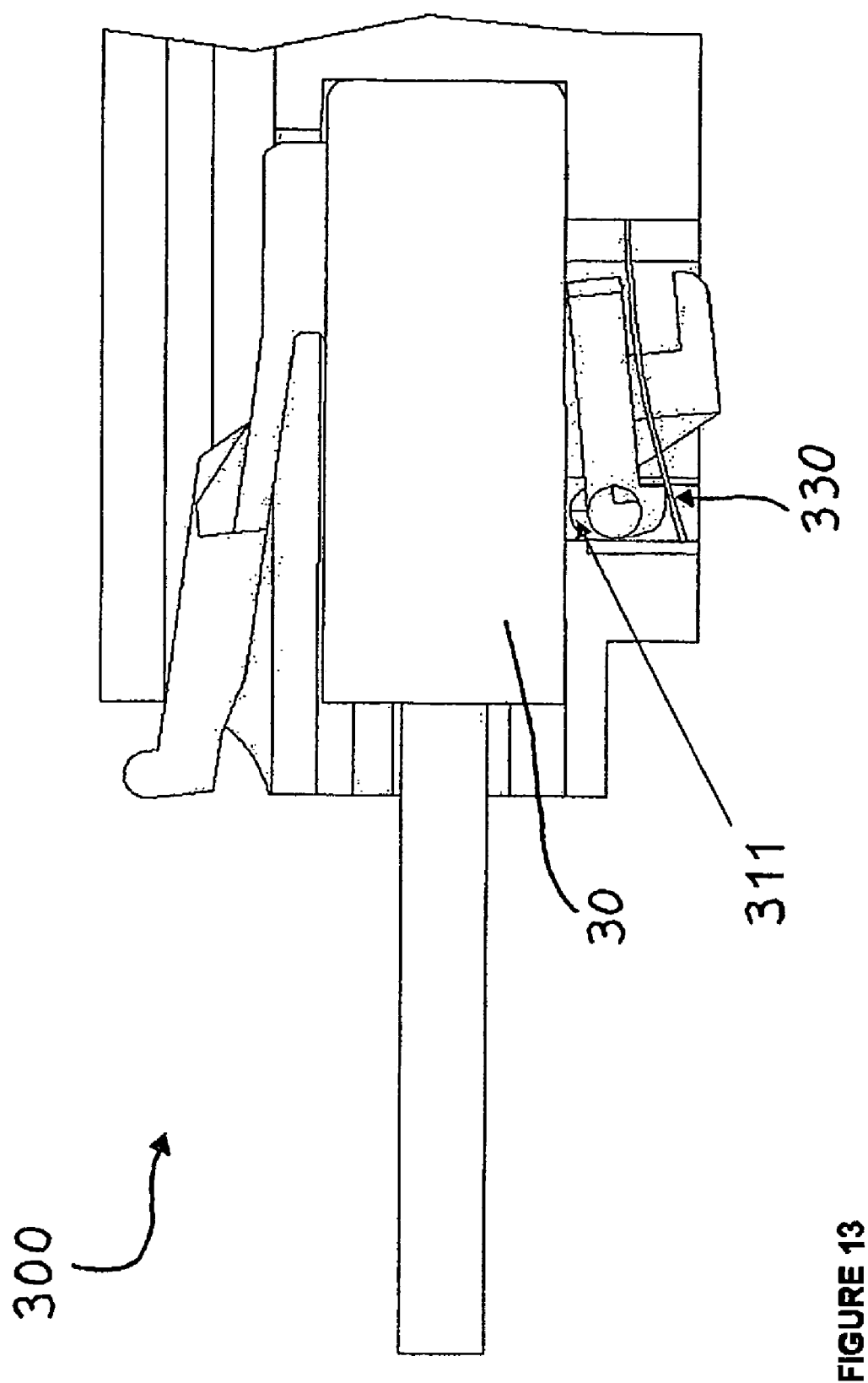
FIG. 13 is a schematic illustrating a legitimate connector fully inserted into the front open cavity associated with the single door embodiment of FIG. 10.

FIG. 10 illustrates insertion of a legitimate connector 30 into inner cavity 322. Connector 30 includes a keying boss 302 extending towards inner door 301. Keying boss 302 is positioned on a face 308 of connector 30 such that it legitimately matches and engages a sloped keying aperture 303 defined on inner door 301 as shown in FIG. 12. Security feature 330 includes a rotation boss 309 extending along the bottom surface of inner door 301 and is substantially circular to allow for rotation during legitimate connector insertion. Rotation boss 309 includes two extending end portions 319. Each end portion 319 defines a cut-out portion 310 adapted to engage the inner cavity 322 of assembly 300. Cut-out portion 310 should be small enough to allow security feature 330 to rotate during legitimate connector insertion.

Referring to FIGS. 10-13, single door 301 of security feature 330 defines a mating keying sloped aperture 303 adapted to accept a keying boss 302 positioned on a legitimate connector 30. Aperture 303 is on a front face of inner door 301 facing towards inserting connector 30. Typically, a bottom surface 304 within aperture 303 slopes substantially upward creating a surface that is adapted to cause inner door 301 to transition vertically downward along path 305 when external pressure is exerted by keying boss 302. Inner cavity 322 further defines two channels 33 adapted to allow extending portions 319 to travel downward during legitimate connector insertion. Inner door 301 is adapted to interact with a leaf spring 334 during downward transition. Leaf spring 334 is adapted to position security feature 330 by applying pressure when inner door 301 rotates back into engaged position.

Insertion of a legitimate keyed connector 30 functions to disengage security feature 300 as follows:

a. When a legitimate connector 30 is inserted, the keying boss 302 of connector 30 enters aperture 303 of inner door. Aperture 303 defines a sloped floor 304;

b. The action of pushing legitimate connector 30 forward causes a small translation 305 downward of inner door 301;

c. When inner door 301 has transitioned downward "X" distance, two locking flanges 306, positioned at the top of inner door 301, are free to rotate out of an interference locking slot 307 defined on a top portion of inner cavity 322. Since locking flanges 306 are now disengaged from locking slot 307 face 308 of connector 30 contacts inner door 301 and it is free to rotate downward, i.e. swing open;

d. At the instant that inner door 301 begins to rotate rotation boss 309 defining cut away 310 disengages from inner cavity key 311 as a result of translation "X". Inner cavity key 311, which serves as a secondary lock when security feature 330 is engaged, forms a center of rotation for inner door 301; and e. When legitimate connector 30 is removed, the moment causing force on rotation boss 309 swings inner door 301 upright and then the translation force moves locking flanges 306 back into the locked position with slot 307.

Connectors associated with the present disclosure define a plurality of positions for a keying boss. Each position matches one of a plurality of aperture positions defined on an inner door 301. If an Illegitimate connector with no keying boss at all is inserted, the face of the connector comes in direct contact with inner door 301. Since inner door 301 does not translate downward, locking flanges 306 remain engaged with inner cavity 322, and inner door 301 does not rotate, thereby preventing access. In an exemplary embodiment, inner door 301 defines a plurality of apertures, defining only one aperture 303 with a sloped floor 304. (An exemplar inner door defining a plurality of apertures is not shown.) If an illegitimate connector is inserted that has a keying boss, the keying boss passes through an aperture defined on inner door 301 that does not define a sloped floor. Thereby preventing fracture of the keying boss, but not translating inner door 301.

Leaf spring 334 is adapted to hold inner door 301 in a vertical obstructing position, or "flipped up" position in the absence of a legitimate connector or during insertion of an illegitimate connector. Leaf spring 334 holds inner door 301 in vertical position by causing a moment about extending portions 319 by applying force to rotation boss 309.

In an exemplary embodiment, inner door 301 hosts a plurality of possible positions for aperture 303. A legitimate connector will have a protruding keying boss 302 that specifically mates with the appropriately positioned aperture 303. Although an exemplary inner door associated with the present disclosure can host a plurality of apertures, e.g. six apertures on an inner door, only the keyed aperture will have a sloped bottom surface adapted to cooperate with the disengaging mechanism described above.

FIG. 12 illustrates a perspective view of inner door 301. As shown in FIG. 12, inner door 301 includes rotating boss 309 and defines aperture 303. Typically inner door 301 further defines a pass through aperture 333 adapted to allow a ferrule (not shown) of an inserting connector to pass through unharmed. Thus, when a connector is inserted, whether it be a legitimate connector or not, the ferrule will not come in contact with inner door. In order to prevent optical communication between two connectors across an optical pathway, inner door 301 can further include a security obstruction feature 331 as shown in FIG. 12. Obstruction feature 331 is adapted to positively block light transmission between connectors. Feature 331 is essentially a physical barrier to light transmission thus operating as an additional security aspect to security feature 330. Feature 331 is connected to inner door 301 and extends a sufficient distance away from inner door 301 to provide sufficient distance from an inserting ferrule as to not come into contact with the ferrule.

Figure 14:
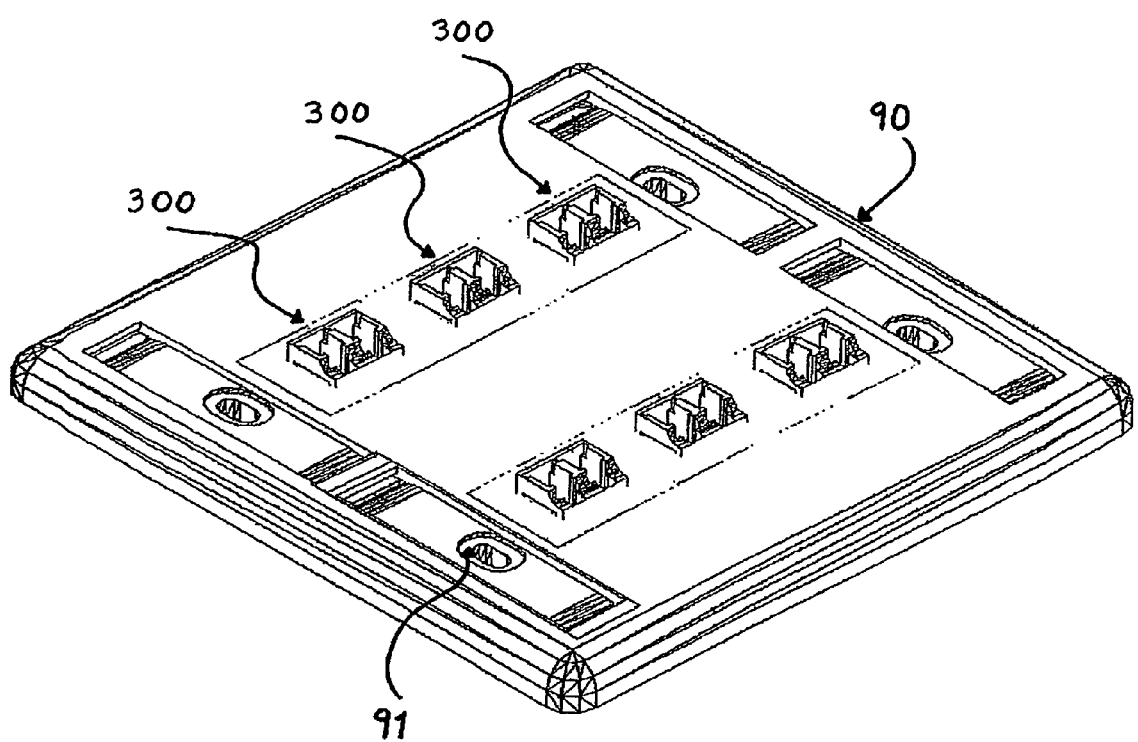
FIG. 14 is a perspective view illustrating a multiport assembly associated with the present disclosure.

Typically, an exemplary embodiment associated with the present disclosure will include a plurality of assemblies 300 as shown in FIG. 14. FIG. 14 illustrates a front side mounting plate 90 adapted to host a plurality of assemblies 300. Mounting plate 90 is also adapted to host a plurality of assemblies 100 or a plurality of assemblies 200. Mounting plate 90 defines a plurality of mounting apertures 91 adapted to allow a mounting feature, e.g., a screw or a bolt, to pass through mounting plate 90 and mount mounting plate 90 onto a wall. An exemplary multi-assembly embodiment associated with the present disclosure includes six assemblies 300 as shown in FIG. 14. In an exemplary embodiment, mounting plate 90 defines four apertures 91 as shown in FIG. 14.

In an exemplary embodiment, assemblies 100, 200 and 300 are fabricated from plastic, metal and/or die cast. Typically, the inner doors associated with the present disclosure are plastic or cast metal depending on required strength of a desired device. Exemplary metals used to fabricate component materials include cast AL or Zinc. Connectors associated with the present disclosure are typically plastic.

The configuration described for an exemplary assembly 100, assembly 200 and/or assembly 300 can also be applied to other communication connector assemblies including but not limited to: LC, MT-RJ, SC, MU, E2000, LX.5 and RJ-45 (Copper Connector). Although with the RJ-45 assembly there is no coaxial optical pathway, connection may be prevented mechanically with the security features of either assembly 100, assembly 200, or assembly 300 as stated in the present disclosure. Assemblies 100, 200 or 300 can each be manufactured as a single unit with their respective security features or separate allowing for insertion of the security feature to complete assembly.

Although the present disclosure has been described with reference to exemplary embodiments and implementations thereof, the disclosed systems and methods are not limited to such exemplary embodiments/implementations. Rather, as will be readily apparent to persons skilled in the art from the description provided herein, the disclosed systems and methods are susceptible to modifications, alterations and enhancements without departing from the spirit or scope of the present disclosure. Accordingly, the present disclosure expressly encompasses such modification, alterations and enhancements within the scope hereof.

What is claimed:

1. A secure connector system comprising:
   an assembly including: (i) a front opening cavity; (ii) a rear opening cavity; and (iii) a security feature;
   wherein, at least the front opening cavity is adapted to accept a first keyed mating connector having a protruding mating keying boss;
   wherein, the security feature is positioned on a bottom surface of the front opening cavity and prevents communication between two illegitimate keyed mating connectors and allows communication between two legitimate keyed mating connectors by the mechanism of an inner door standing vertical when engaged and rotating downward when disengaged, the inner door further defining a mating keying sloped aperture adapted to accept the protruding mating keying boss of the first keyed mating connector when the first keyed mating connector is a legitimate keyed mating connector; and
   wherein, the protruding mating keying boss of the first keyed mating connector disengages the security feature when the first keyed mating connector is a legitimate keyed mating connector.

2. A system according to claim 1, wherein the security feature further includes:
   (i) two die cast boss elements attached to the sides of the inner door and adapted to slide into two channels further defined on the bottom surface of the front opening cavity;
   (ii) a cam shaped element attached to a rear side of the inner door;
   (iii) a leaf spring interacting with the cam shaped element wherein the leaf spring applies pressure to the cam shaped element holding the inner door upright in the absence of external pressure; and
   (iv) a locking boss extending outwardly on a front face of the inner door in contact with a lip feature included on the opening cavity of the assembly and adapted to prevent rotation of the inner door during illegitimate keyed mating connector insertion.

3. A system according to claim 1, wherein the protruding mating keying boss of the first keyed mating connector extends outwardly towards the security feature and is adapted to apply pressure to the mating keying sloped aperture of the inner door when the first keyed mating connector is a legitimate keyed mating connector.

4. A system according to claim 1, wherein the assembly further defines an optical pathway, the optical pathway being blocked when the security feature is engaged, wherein the rear opening cavity is adapted to accept a second keyed mating connector, and wherein the first and second keyed mating connectors are fiber optic connectors adapted to optically communicate across the optical pathway of the assembly when the first and second keyed mating connectors are legitimate keyed mating connectors.

5. A system according to claim 4, wherein the security feature is disengaged during legitimate connector insertion and will rotate a sufficient degree and lay flush and substantially parallel within a bottom surface cavity further defined in the assembly to allow for the first and second keyed mating connectors to communicate via the optical pathway when the first and second keyed mating connectors are legitimate keyed mating connectors.

6. A system according to claim 1, wherein the security feature is disengaged when a protruding mating keying boss of a legitimate keyed mating connector applies pressure to the mating keying sloped aperture causing the inner door to transition downward into two channels defined on the bottom surface of the front opening cavity disengaging the locking door.

7. A system according to claim 1, wherein the inner door rotates downwardly during insertion of a legitimate keyed mating connector resulting from pressure being applied to the inner door from a front face of the legitimate keyed mating connector.

8. A system according to claim 1, wherein the security feature is positioned recessed within the front opening cavity.

9. A system according to claim 1, wherein the mating keying sloped aperture of the inner door is uniquely positioned on the inner door to effectively mate with a matching protruding keying boss of a legitimate keyed mating connector.

10. A system according to claim 1, wherein the inner door defines a plurality of locations to uniquely position the mating keying sloped aperture.

11. A system according to claim 1, wherein the assembly and the first keyed mating connector are color coded to match colors when the first keyed mating connector is a legitimate keyed mating connector to provide for visual guidance to a network user.

12. A system according to claim 1, wherein the assembly further includes a second security feature positioned on a bottom surface of the rear opening cavity.

13. A system according to claim 1, wherein the security feature her includes:
 (i) a rotating boss having two extending portions attached on a bottom portion of the inner door adapted to slide into two channels further defined on the bottom surface of the opening cavity and rotate downward during legitimate connector insertion, wherein each extending portion defines a cut-out portion adapted to engage an inner cavity key adapted to further secure the inner door in a substantially vertical position;
 (ii) two locking flanges included on a top portion of the inner door adapted to engage locking slots defined on a top portion of the inner cavity; and
 (iii) a leaf spring interacting with the rotating boss wherein the leaf spring applies pressure to the rotating boss holding the inner door upright in the absence of external pressure.

14. A system according to claim 13, wherein the security feature is disengaged when a protruding mating keying boss of a legitimate mating keying connector applies pressure to the mating keying sloped aperture causing the inner door to transition downward into two channels defined on the bottom surface of the front opening cavity disengaging the locking flanges.

15. A system according to claim 1, wherein the inner door further defines a pass through aperture adapted to prevent damaging a ferrule included on the first keyed mating connector during legitimate or illegitimate connector insertion.

16. A system according to claim 1, wherein the inner door further includes a security obstruction feature mounted with respect to a rear side of the inner door extending upwardly with respect to the bottom surface of the front opening cavity positioned such that optical communication is obstructed between two inserting connectors when the inner door is standing vertical.

17. A secure communications network system, comprising:
 a plurality of assemblies wherein each assembly includes (i) a front opening cavity; (ii) a rear opening cavity; and (iii) a security feature;
 wherein, at least the front opening cavity is adapted to accept a first keyed mating connector having a protruding mating keying boss;
 wherein, the security feature is positioned on a bottom surface of the front opening cavity and prevents communication between two illegitimate keyed mating connectors and allows communication between two legitimate keyed mating connectors by the mechanism of an inner door standing vertical when engaged and rotating downward when disengaged, the inner door further defining a mating keying sloped aperture adapted to accept the mating keying boss of the first keyed mating connector when the first keyed mating connector is a legitimate keyed mating connector; and
 wherein, the protruding mating keying boss associated with the first keyed mating connector disengages the security feature when the first keyed mating connector is a legitimate connector.

18. A system according to claim 17, wherein each assembly of the plurality thereof is colored a designated color corresponding to a matching colored legitimate keyed mating connector providing visual guidance to a network user.

19. A system according to claim 17, wherein the assembly further defines an optical pathway, the optical pathway being blocked when the security feature is engaged, wherein the rear opening cavity is adapted to accept a second keyed mating connector, and wherein the first and second keyed mating connectors are fiber optic connectors adapted to optically communicate across the optical pathway of the assembly when the first and second keyed mating connectors are legitimate keyed mating connectors.

20. A system according to claim 19, wherein the security feature is disengaged during legitimate connector insertion and will rotate a sufficient degree and lay flush and substantially parallel within a bottom surface cavity further defined in the assembly to allow for the first and second keyed mating connectors to communicate via the optical pathway when the first and second keyed mating connectors are legitimate keyed mating connectors.

21. A system according to claim 17, wherein the security feature includes:
 (i) two die cast boss elements attached to the sides of the inner door and adapted to slide into two channels further defined on the bottom surface of the opening cavity;
 (ii) a cam shaped element attached to a rear side of the inner door;
 (iii) a leaf spring interacting with the cam shaped element wherein the leaf spring applies pressure to the cam shaped element holding the inner door upright in the absence of external pressure; and
 (iv) a locking boss extending outwardly on a front face of the inner door in contact with a lip feature included on the opening cavity of the assembly and adapted to prevent rotation of the inner door during illegitimate connector insertion.

22. A system according to claim 17, wherein the protruding mating keying boss of the first keyed mating connector extends outwardly towards the security feature and is adapted to apply pressure to the mating keying sloped aperture of the inner door if the first keyed mating connector is a legitimate keyed mating connector.

* * * * *